United States Patent [19]

Fung et al.

[11] Patent Number: 5,323,656
[45] Date of Patent: Jun. 28, 1994

[54] OVERPRESSURE-PROTECTED, POLYSILICON, CAPACITIVE DIFFERENTIAL PRESSURE SENSOR AND METHOD OF MAKING THE SAME

[75] Inventors: Clifford D. Fung, Mansfield; Kevin H.-L. Chau, Franklin, both of Mass.

[73] Assignee: The Foxboro Company, Foxboro, Mass.

[21] Appl. No.: 881,707

[22] Filed: May 12, 1992

[51] Int. Cl.$^5$ .................... G01L 9/12; G01L 13/02
[52] U.S. Cl. ........................ 73/718; 73/724; 361/283.3; 29/25.41
[58] Field of Search ............ 361/283; 29/25.41; 73/718, 724, 754

[56] References Cited

U.S. PATENT DOCUMENTS

| | | | |
|---|---|---|---|
| 4,040,172 | 8/1977 | Kurtz et al. | 29/580 |
| 4,072,057 | 2/1978 | Yasuhara et al. | 73/718 |
| 4,120,206 | 10/1978 | Rud, Jr. | 73/718 |
| 4,158,311 | 6/1979 | Yasuhara et al. | 73/718 |
| 4,332,000 | 5/1982 | Peterson | 361/283 |
| 4,390,925 | 6/1983 | Freud | 361/283 |
| 4,420,790 | 12/1983 | Golke et al. | 361/283 |
| 4,424,713 | 1/1984 | Kroninger, Jr. et al. | 73/718 |
| 4,445,383 | 5/1984 | Binder et al. | 73/718 |
| 4,467,394 | 8/1984 | Grantham et al. | 361/283 |
| 4,572,000 | 2/1986 | Kooiman | 73/718 |
| 4,586,109 | 4/1986 | Peters et al. | 361/283 |
| 4,609,966 | 9/1986 | Kuisma | 361/283 |
| 4,730,496 | 3/1988 | Knecht et al. | 73/724 |
| 4,754,365 | 6/1988 | Kazahaya | 361/283 |
| 4,905,575 | 3/1990 | Knecht et al. | 92/103 SD |
| 4,949,581 | 8/1990 | Rud, Jr. | 73/706 |
| 5,062,302 | 11/1991 | Peterson et al. | 73/754 |
| 5,211,058 | 5/1993 | Fukiura et al. | 73/724 |

FOREIGN PATENT DOCUMENTS

| | | |
|---|---|---|
| 0339981 | 11/1989 | European Pat. Off. . |
| 0490486 | 6/1992 | European Pat. Off. . |
| 0500234 | 8/1992 | European Pat. Off. . |
| 3827138 | 11/1989 | Fed. Rep. of Germany . |
| 9102748 | 7/1991 | Fed. Rep. of Germany . |

OTHER PUBLICATIONS

European Search Report mailed Sep. 23, 1993.
Chau et al. "Scaling Limits in Batch-Fabricated Silicon Pressure Sensors" IEEE Transactions on Electron Devices 1987, vol. ED-34, No. 4, pp. 850-858.

*Primary Examiner*—Richard E. Chilcot, Jr.
*Assistant Examiner*—Joseph L. Felber
*Attorney, Agent, or Firm*—Lahive & Cockfield

[57] ABSTRACT

A capacitive differential pressure sensing device with pressure overrange protection and a method of making the same are described. The device employs a doped polysilicon diaphragm overlying a cavity in a doped single crystal silicon wafer having a port extending into the cavity from the opposite side. The cavity floor serves as an overrange protector.

17 Claims, 3 Drawing Sheets

OVERPRESSURE-PROTECTED, POLYSILICON, CAPACITIVE DIFFERENTIAL PRESSURE SENSOR AND METHOD OF MAKING THE SAME

FIELD OF THE INVENTION

The present invention relates to a pressure sensor for sensing differential pressure and more particularly to an overpressure-protected capacitive sensor formed on a semiconductor substrate and a method of manufacturing such a substrate.

BACKGROUND OF THE INVENTION

A number of pressure sensors are known to utilize a silicon diaphragm which deflects in response to pressure. Deflection of the diaphragm is generally detected by electronic sensing elements such as piezoresistive elements placed on the edges of the diaphragm. These sensors are generally designed so that batch fabrication is possible. The range of pressure detection will depend on the size, thickness and span of the diaphragms. One such sensor is described in U.S. Pat. No. 4,949,581. The sensor there described includes overpressure protection features. Pressure applied to the sensor is limited by two isolator diaphragms separate from the sensor itself. When a preselected differential pressure limit is exceeded, the deflection of one of the islolator diaphragms (responding to the greater pressure) bottoms against a diaphragm support. Once bottomed against the support, no further increases in pressure are transmitted to the sensor. The pressure limits of these devices are set to protect the sensor diaphragm which has a relatively low pressure limit from pressures which will permanently deform it and thereby degrade the sensor's performance. Characteristics of this system which detract from its performance include both hysteresis and diminished sensitivity as a result of the circuitous pressure paths between the overpressure protecting diaphragms and the separate sensing diaphragms.

An alternate design for a bidirectional pressure sensor is disclosed in U.S. Pat. No. 4,905,575 issued to Knecht et al on Mar. 6, 1990. According to the teachings of Knecht et al, a silicon diaphragm is mounted between two glass base plates which have recesses formed therein to receive the diaphragm and provide support across the diaphragm under overpressure conditions. The support plates serve as positive stops when the diaphragm is subject to overpressure and thus prevent overstressing the diaphragm. The pressure sensor disclosed in this patent further includes a diaphragm having grooves formed on opposite surfaces to define a center deflecting portion. The grooves provide a "free edge" effect which reduces bending stress at the diaphragm edge and permit a higher operating pressure without breakage.

Removing material to Provide grooves on opposite surfaces of the diaphragm, however, requires tight control tolerances during manufacture. Precise alignment of the glass base supports during assembly is also critical, especially when the sensor has an array of sensing diaphragms with different sensing ranges. Further, glass and silicon differ in strength and thermal coefficients. When the sensor is intended for applications over wide temperature and pressure ranges, the material property mismatch can create stresses and large sensing errors which may be difficult to overcome.

It is a primary object of this invention to provide a capacitive, differential, low pressure sensor which can be fabricated using semiconductor techniques and which also includes pressure overrange protection.

It is another object of this invention to provide a bidirectional, capacitive, differential low pressure sensor including bidirectional pressure overrange protection.

SUMMARY OF THE INVENTION

Broadly speaking, the present invention Provides a semiconductor, capacitance type pressure sensor having a pressure overrange mechanical stop and a method for manufacturing it. The sensor is formed with a polycrystalline silicon (polysilicon) diaphragm overlying an open topped cavity in a single crystal silicon wafer, doped to an n+ or p+state. A portion of the polysilicon layer is doped to create an electrically conductive region on the diaphragm, so that a capacitor is formed between the diaphragm and the conducting surface of the floor of the cavity. The floor of the cavity also serves as a mechanical overrange stop. Electrical contacts provide independent electrical connections to the two electrodes of the capacitor. Either the bottom surface of the diaphragm or the surface of the floor of the cavity may be formed with a dielectric coating, such as silicon oxide or silicon nitride, so that overrange pressure will not create a short circuit. Such a sensor has a number of advantages over conventional pressure sensors. It is substantially temperature independent, has minimal parasitic capacitance, and has high sensitivity at low pressure. Because of the integral nature of the assembly it avoids the hysteresis characteristic of complex overrange protection mechanical systems. The system of this invention can be manufactured economically because it does not require machined mechanical parts and springs. The sensor can still be protected from hostile fluids by metal isolation diaphragms and fill fluids.

The method of the invention for constructing the pressure sensor, includes forming a single crystal silicon wafer with two opposed parallel surfaces, one of which includes an open cavity having a prescribed depth from the surface. The cavity is filled with a suitable sacrificial spacer material, such as a silicon oxide, so that the oxide upper surface forms a smooth continuous surface with the upper surface of the silicon wafer. A layer of polysilicon is deposited on this upper surface and overlies the oxide filled cavity. At least a portion of the polysilicon layer overlying the cavity is doped to form a p+region. An opening is then etched in the opposed parallel surface of the wafer through the wafer, establishing a passage to the oxide filled cavity. Through this passage, the oxide in the cavity can be etched, thereby forming at the upper surface of the wafer a thin diaphragm of conducting polysilicon overlying a cavity of defined depth.

The area of the passageway opening to the reverse side of the wafer is small in comparison to the floor area of the cavity and is preferably located away from the center of the cavity floor so that the conducting diaphragm, together with the cavity floor serves as a capacitor, with the diaphragm able to flex, thereby varying the capacitance in response to differential pressure applied across the diaphragm. While this construction employs a polysilicon layer with a portion doped to form a conductive area, other constructions employing an electrically insulating layer having a portion treated to render it electrically conductive may be substituted.

A second embodiment of the sensor of this invention can be constructed with another electrode on the opposite side of the polysilicon diaphragm from the wafer cavity so that a bidirectional pressure sensor is formed. By providing that the second electrode is spaced from the diaphragm, a mechanical stop against overrange pressure in the second direction can also be formed.

DESCRIPTION OF PREFERRED EMBODIMENTS

Figure 1:
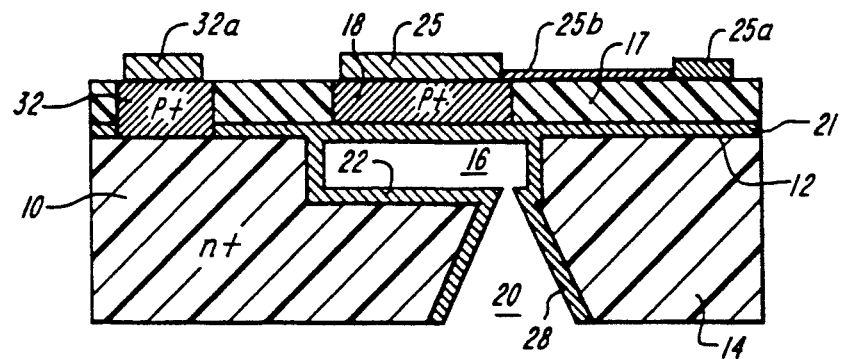
FIG. 1 is a generally cross sectional view of a pressure sensor constructed in accordance with the principles of this invention.
Figure 1A:
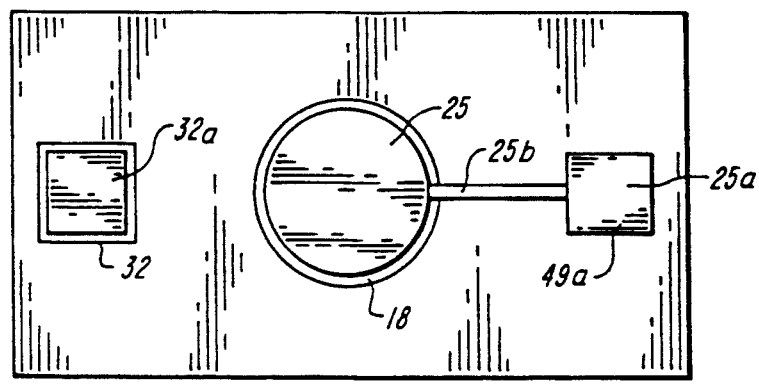
FIG. 1A is a plan view of the sensor of FIG. 1.

With reference now to FIGS. 1 and 1A, a preferred embodiment of this invention is illustrated. A single crystal silicon wafer 10 having opposed parallel surfaces 12 and 14 is doped to an n+state. The upper surface 12 of the wafer has an open cavity 16 formed therein. A layer of polycrystalline silicon (polysilicon) 17 extends over the surface 12 of the wafer and forms a thin diaphragm 18 over the cavity 16. This diaphragm is formed of a portion of layer 17, which portion has been doped to form a p+region. An opening 20 is formed in the opposite surface 14 of the wafer and extends through the wafer forming a passageway, generally in the shape of a truncated pyramid, to the floor 22 of the cavity 16. The opening into the cavity is positioned away from the center of the floor area. The inner surface of the opening 20 and of the cavity 16 is shown coated with a dielectric layer 28, which typically would be silicon oxide or silicon nitride. The dielectric coating 28 may also cover the lower surface of the polysilicon diaphragm 18. A metallized area 25, which typically is a thin layer of aluminum deposited on the surface of the polysilicon diaphragm 18, serves as an electrical contact to that diaphragm. A contact pad 25a suitable for bonding to a wire is connected through a metallized strip 25b to contact area 25.

An electrical contact to the body of the single crystal silicon wafer 10 can be formed either by a deposited metal, again such as aluminum, on the bottom surface of the wafer or, alternatively a second area of the polysilicon coating 32 can be doped to a conductive state and then have its upper surface metallized to serve as an electrical contact 32a to the wafer 10.

With this configuration, then, the doped polysilicon diaphragm 18 serves as one electrode of a capacitor, with the floor surface 22 of the cavity 16 serving as the other electrode of that capacitor. In response to differential pressure, the diaphragm 18 will flex, thereby providing for a variation in capacitance in response to changes in pressure. The floor surface 22 of the cavity 16 provides a mechanical limit stop to the flexing of the diaphragm 18, thereby serving as a pressure overrange limit. Since the undoped region of the polysilicon layer 17 is non-conductive parasitic capacitance from diaphragm 18 to the contact pads is minimized.

Suitable dimensions for the illustrated device are as follows:

TABLE

| | |
|---|---|
| diaphragm thickness | 2 μm (1–4 μm) |
| diaphragm diameter | 30 μm to 500 μm |
| capacitance gap | 0.5 μm to 2 μm |

Suitable circuits for measuring variable capacitances are well known in the art.

Figure 2A:
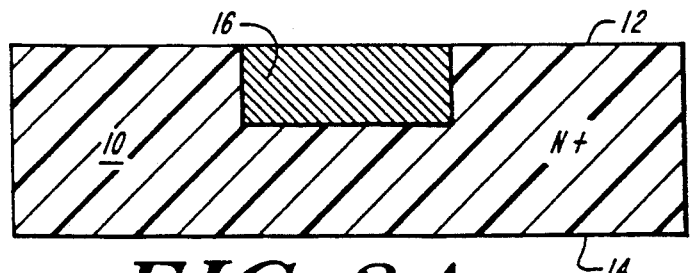
FIGS. 2A though 2C are cross sectional illustrations of steps in a method of constructing a sensor in accordance with the principles of this invention.
Figure 2B:
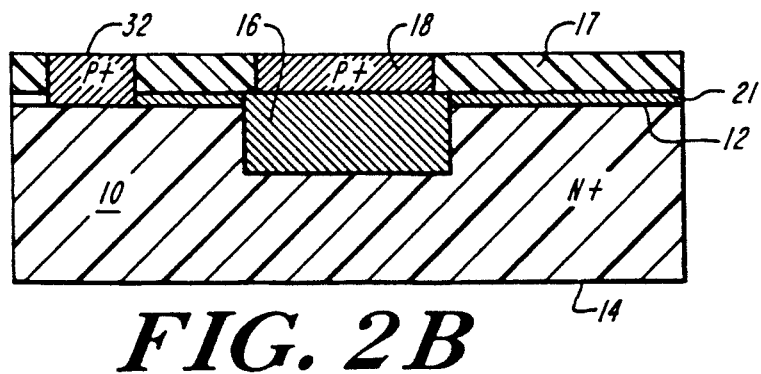
Figure 2C:
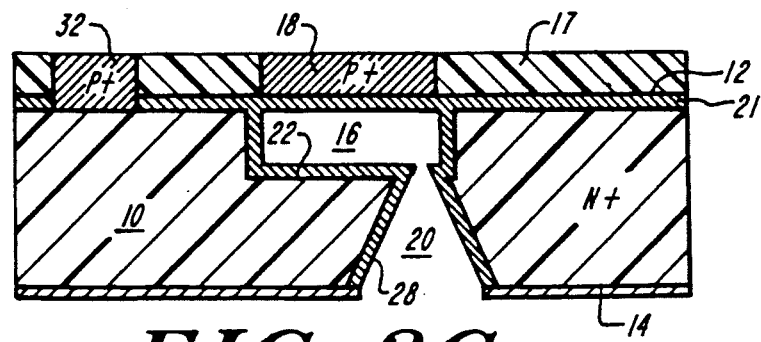

FIGS. 2A through 2C illustrate a multistep method for constructing the sensor illustrated in FIGS. 1. and 1A.

In the step illustrated in FIG. 2A, a single crystal silicon wafer 10 is formed with a cavity 16 in its upper surface, with the cavity filled with a sacrificial spacer material, such as silicon oxide, so that the upper surface of the oxide filled cavity forms a smooth continuous layer with the upper surface 12 of the wafer 10. A thin dielectric layer 21 is then selectively coated on this upper surface 12. This thin dielectric layer 21 electrically insulates the bottom surface of the diaphragm 18 providing electrical insulation for the capacitor plate formed by that diaphragm. Selective deposit of the dielectric layer allows for openings therein to provide access to wafer 10 for electrical contact to it such as at region 32.

In the next step of the process, illustrated in FIG. 2B, a layer of polysilicon 17 is deposited using commercial techniques, such as, from silane gas, on the insulating layer 21 and the exposed portion of the wafer and extends over the oxide filled cavity 16. A suitable photoresist mask is employed to provide for selective doping of the region 18 of the polysilicon layer overlying the oxide filled cavity, to form a conductive p+region. Typically this doping can be carried out by boron ion implantation as illustrated in FIGS. 2B and 2C. A second region 32, separate from the area overlying the cavity, can be doped to form an electrically conductive contact to the single crystal silicon wafer 10. Portions of the upper surface of both region 18 and region 32 are metallized to form suitable electric contracts.

In FIG. 2C, an opening 20 is anisotropically etched from the surface 14 of the wafer to the floor surface 22 of the oxide filled cavity 16. This etching may be accomplished by any conventional anisotropic etched procedure, using, for example, KOH. The surface 14 is first coated with oxide and/or nitride, then the area to be etched is defined with a photoresist mask and the oxide/nitride layer within this area is etched using plasma and HF solution until the silicon wafer surface itself is exposed. The oxide in the cavity 16 serves as a natural stop for the etching procedure since the etch rate of the oxide is typically two orders of magnitude lower than the corresponding etch rate for the silicon. The resultant opening 20 will have a generally tapered shape as shown. The wafer is then rinsed and cleaned. Typical KOH etch conditions are 50% by weight of KOH in water at 90° C. After the silicon etching is completed, an oxide remover such as HF may then be used to etch all of the oxide from inside of the cavity 16 thereby converting the thin conductive polysilicon layer 18 overlying the cavity to a thin diaphragm, which can serve as the flexible electrode of the pressure sensitive capacitor, with the conductive floor 22 of the cavity 16 serving as the other electrode. Typically the interior surface of the opening 22 and of the cavity 16, including the bottom surface of the polysilicon diaphragm 18, are passivated by a subsequent oxide or nitride coating 28 using, for example, plasma enhanced chemical vapor deposition techniques.

A semiconductor capacitive pressure sensor, as illustrated in FIG. 1 provides for a differential pressure sensor having a mechanical pressure overrange stop, which can be readily constructed using semiconductor technology.

Figure 3:
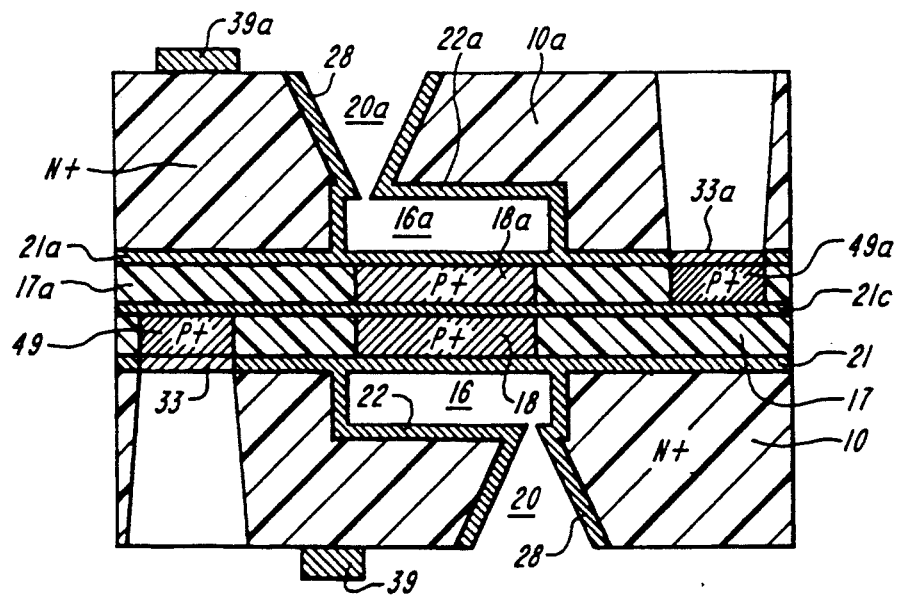
FIG. 3 is a cross sectional view of a bidirectional pressure sensor constructed in accordance with the principles of this invention.

In FIG. 3 there is illustrated a bidirectional differential pressure sensor having a pressure overrange mechanical stop in both directions. The sensor is formed essentially of two unidirectional differential pressure sensors as illustrated in FIG. 1, with one mounted on top of the other such that the polysilicon layers are bonded back to back. Thus the sensor is formed as a pair of substantially identical sensor modules joined together. In FIG. 3 like numbers refer to like parts as illustrated in FIG. 1, and the corresponding parts of the second unidirectional sensor module employed are indicated with the subscript a. For example, the cavity of the second module is 16a. The diaphragms 18 and 18a are bonded together by means of a suitable bonding layer 21c between them forming a single mechanical unit. The bonding may, for example, be an oxide coating, or may be an undoped polysilicon deposition. The resulting sensor has a pair of capacitors, one formed by the diaphragm 18 and the floor 22 of cavity 16 in the silicon wafer 10, and the other formed by the diaphragm 18a, together with the floor area 22a of the cavity 16a in the second wafer 10a. Thus the capacitance of each of these capacitors varies as the diaphragm flexes in one direction or the other forming a push-pull combination, eliminating common mode error. This arrangement doubles the differential signal. In this configuration thin layers of dielectric 21 and 21a electrically insulate their respective wafers 10 and 10a from the polysilicon layers. Electrical contact to the wafers 10 and 10a is accomplished through aluminum tabs 39 and 39a. The electrical connection to the diaphragms is through metallized layers 33 and 33a through openings in the dielectric layers 21 and 21a to P+doped areas 49 and 49a which extend to diaphragms 18 and 18a respectively as narrow conductive strips in layers 17 and 17a. The floor 22 of cavity 16 acts as a pressure overrange limit stop in one direction, while the floor 22a of cavity 16a acts as a mechanical pressure overrange limit stop in the other direction.

Figure 4:
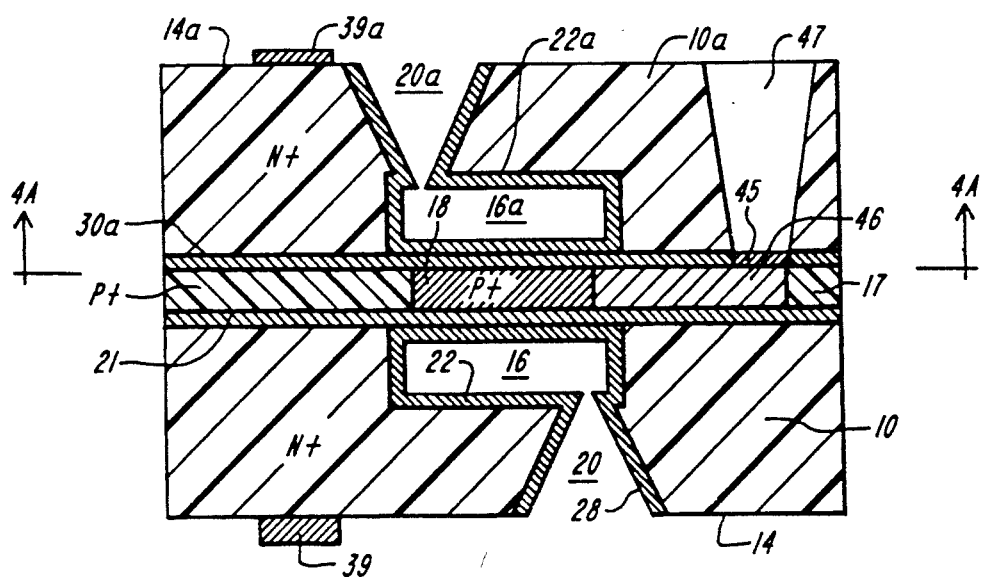
FIG. 4 is a cross sectional view of an alternative embodiment of a bidirectional pressure sensor constructed in accordance with the principles of this invention.
Figure 4A:
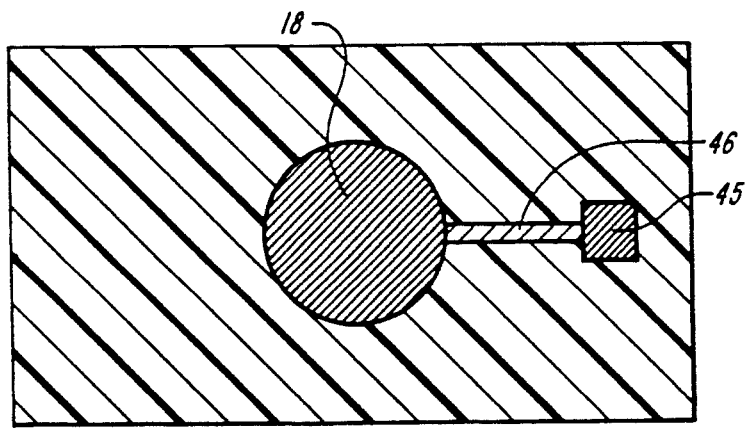
FIG. 4A is a cross section of the sensor of FIG. 4 taken along lines 4—4.

FIG. 4 illustrates yet another embodiment of the bidirectional differential pressure sensor of this invention. This embodiment is similar in construction to the embodiment illustrated in FIG. 3. However, in this instance, one single-sided sensor module, as illustrated in FIG. 1, is formed on wafer 10 and a second sensor module is formed on wafer 10a, with the second module lacking the layer of polysilicon 17 which forms the diaphragm 18. This, second "open-topped", sensor module formed on wafer 10a is then placed on top of the basic module, with the single crystal silicon wafer 10a bonded, such as by an oxide growth 30a, to the polysilicon layer 17 on the top of the wafer 10. In this configuration the single diaphragm 18 serves as a common electrode for two capacitors, one formed by the diaphragm 18 and the floor 22 of cavity 16, and the other capacitor formed between that same diaphragm 18 and the floor 22a of cavity 16a in the wafer 10a. The overrange pressure stops operate in the same fashion as for the device illustrated in FIG. 3. In this instance a conductive strip 46, as illustrated in FIG. 4A, provides electrical contact to the diaphragm 18 from contact pad 45 through opening 47 (FIG. 4). The openings 20 and 20a in the back surfaces 14 and 14a of the wafers allow different pressures to reach both sides of diaphragm 18. Conductive pads 39 and 39a provide for electrical connections to the two wafers.

Figure 5:
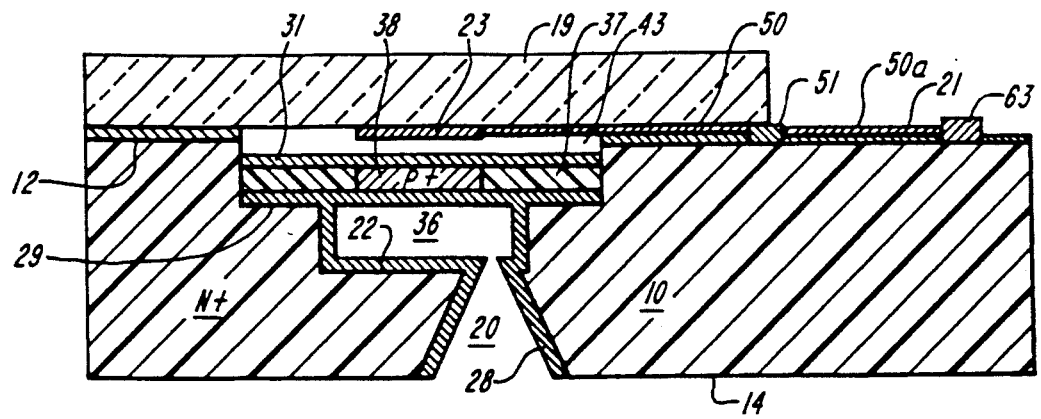
FIG. 5 is a cross sectional view of yet another embodiment of a sensor constructed in accordance with the principles of this invention.

In FIG. 5 there is illustrated an alternative embodiment of a bidirectional differential pressure sensor. In this embodiment, a single crystal silicon wafer 10 having an upper surface 12 and a lower surface 14 is doped to an n+ or p+conductive state. However, in this embodiment, a cavity is formed in the upper surface 12 as a two-step recess, the smaller diameter recess 36 extending from the floor of the larger diameter upper recess 43. A layer of dielectric 29 overlaid by a layer of polysilicon 37 is coated onto the surface of the floor of the larger upper recess 43 while the lower recess 36 is initially filled with a sacrificial oxide. Similarly a layer of dielectric 21 is coated on the upper surface 12 of the wafer 10, leaving however an opening to allow electrical contact to pad 62. A limited area of the polysilicon layer 37 overlying the lower recess 36 is doped, such as by boron ion implantation to a p+conductive state forming an electrically conductive diaphragm 38. This area is smaller in diameter than the diameter of the lower recess 36. A thin dielectric layer 31 is coated over the polysilicon layer 37. Dielectric layers 29 and 31 serve to electrically insulate diaphragm 38 which is acting as a capacitor plate. An electrical conductor 24, (FIG. 5A) electrically insulated from the silicon wafer may, for example, be placed in the bottom of a trough 38a in the top of the wafer to serve as an electrical connection to the conductive portion 38 of the polysilicon layer 37.

A glass sheet 19 is placed on the top of the wafer 10 overlying the recess 43 and bonded to the dielectric layer 21 on the upper surface 12 of the wafer 10. A conductive area 23, formed of aluminum, such as by a metallizing process, is formed on the underside of the glass sheet 19 with a diameter approximately the same as that of diaphragm 38. A connecting strip 50, (FIG. 5A) electrically insulated from the wafer surface 12 by the dielectric 21 is formed on the underside of the glass 19 and is compression bonded at bond 51 to a conductive strip 50a on dielectric layer 21 to provide for an electrical contact between the metallized section 23 overlying, and aligned with, the lower recess 36 and electrical contact pad 63, also electrically isolated from wafer 10 by dielectric layer 21.

In this configuration (FIG. 5 and FIG. 5A), diaphragm 38, formed from the doped polysilicon layer overlying the lower cavity 36, serves as one electrode of a capacitor. The floor 22 of the cavity 36, serves as the second electrode of the capacitor, the capacitance of which varies with the flexing of the diaphragm 38. A mechanical overrange limit stop is formed by the floor 22 of the smaller recess 36. A second capacitor is formed between the diaphragm 38 and the conductive area 23 of the glass plate 19. The value of this capacitance is also affected by the position of the diaphragm 38, and the bottom of the glass plate 19 serves as a mechanical stop to provide pressure overrange protection against the diaphragm 38 flexing too far in the direction of the glass plate. Appropriate ports (not shown) through either the glass plate or the wafer 10 allow pressure to alter the gap between the diaphragm 38 and the glass plate 19. The opening 20 from the bottom surface of the wafer through to the floor 22 of the cavity provides for pressure on that side of the diaphragm 38.

Figure 5A:
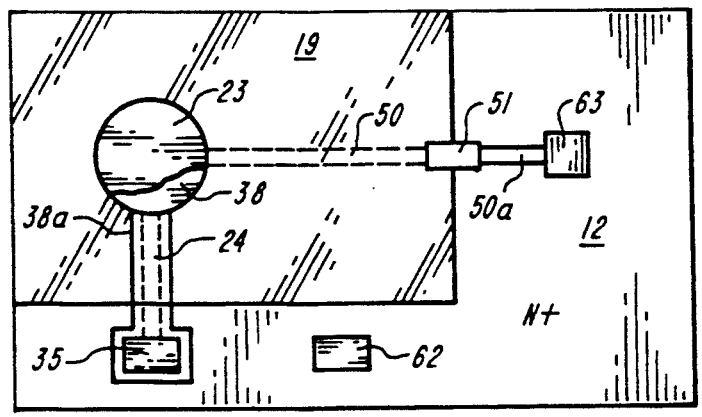
FIG. 5A is a plan view of the sensor of FIG. 5.

FIG. 5A is a plan view showing the arrangement of the electrical contacts for the embodiment illustrated in FIG. 5. The upper electrode 23 is connected through conducting strips 50 and 50a to an electrical contact 63. The diaphragm 38 is connected to electrical contact 35, and a metallized contact 62 on the surface of wafer 10 provides electrical connection for the bottom electrode 22.

Pressure sensors constructed as above described can be used in a variety of applications. For example, with back port 20 closed the sensor serves as an absolute pressure sensor. When the front and back sensors are supplied with different pressures the device is a differential pressure sensor. With the port 20 open to atmosphere it becomes a gage pressure sensor. The sensor can be used with any fluid, either gas or liquid.

While specific embodiments of the invention have been shown, the invention should be limited only as described in the appended claims.

We claim:

1. A capacitive pressure sensing device comprising,
   a silicon wafer doped to a conductive state and having first and second opposed parallel surfaces,
   a cavity formed as an opening in said first surface to a prescribed depth with a floor of generally predetermined area at said prescribed depth parallel to said first surface,
   a layer of electrically insulating material deposited on said wafer first surface and extending across the opening of said cavity, said layer being treated to place it in a conductive state in a first area overlying at least a portion of said cavity to form a flexible electrically conductive diaphragm;
   said second surface of said wafer having an opening providing a passage through said wafer into said cavity, the opening of said passage into said cavity having an area small compared to area of said cavity floor,
   first and second electrical contact means for providing independent electrical contacts to said silicon wafer and to said diaphragm, said diaphragm and said cavity floor forming a capacitor whose capacitance varies with variation in differential pressure across said diaphragm.

2. A pressure sensing device in accordance with claim 1 wherein said layer of electrically insulating material is polysilicon and said treatment is doping.

3. A pressure sensing device in accordance with claim 2 wherein a thin dielectric layer is coated on said silicon wafer first surface between said first surface and said polysilicon layer.

4. A device in accordance with claim 2 wherein a second area of said polysilicon layer spaced apart from said first doped area is doped to provide said electrical contact to said wafer.

5. A device in accordance with claim 1 wherein at least one of said cavity floor and a surface of said diaphragm have an electrically insulating coating thereon.

6. A device in accordance with claim 1 wherein said electrical contact to said wafer is made to said second wafer surface.

7. A device in accordance with claim 1 wherein said opening in said second surface is closed so that said device serves as an absolute pressure sensor.

8. A device in accordance with claim 1 wherein said opening in said second surface is open to atmosphere so that said device serves as a gage pressure sensor.

9. A differential capacitive bidirectional pressure sensing device comprising,
   a first sensor module having,
      a single crystal silicon wafer doped to a conductive state and having first and second opposed parallel surfaces,
      a cavity formed as an opening in said first surface to a prescribed depth with a floor of generally predetermined area at said prescribed depth parallel to said first surface,
      a layer of electrically insulating material deposited on said wafer first surface and extending across the opening of said cavity, said layer being treated to render it in an electrically conductive state in an area overlying at least a portion of said cavity to form a flexible electrically conductive diaphragm;
   said second surface of said wafer having an opening providing a passage through said wafer into said cavity, the opening of said passage into said cavity having an area small compared to the area of said cavity floor,
   said cavity floor serving as an overrange pressure stop for pressure acting to move said diaphragm toward said cavity floor,
   first and second electrical contact means for providing independent electrical contacts to said silicon wafer and to said diaphragm, said wafer and said diaphragm forming a capacitor whose capacitance varies with variations in differential pressure across said diaphragm;
   a second sensor module formed substantially identical to said first module; said modules being joined together by placing each module's electrically insulating layers in facing juxtaposition and bonded together, said first module and said second module diaphragms being connected together electrically, thereby forming a pair of capacitors with a common flexible electrode to provide variations in the capacitances of said pair of capacitors in response to variations in differential pressure across said common flexible 10. A differential pressure sensing device in accordance with claim 9, wherein said layer of electrically insulating material on at least one of said modules is polysilicon and said layer is treated by doping to place it in a conductive state.

11. A differential pressure sensing device in accordance with claim 10 comprising a thin dielectric layer coated on said silicon wafer first surface between said first surface and said polysilicon layer.

12. A differential capacitive bidirectional Pressure sensing device comprising,
    a first sensor module having, a single crystal silicon wafer doped to a conductive state and having first and second opposed parallel surfaces, a cavity formed as an opening in said first surface to a prescribed depth with a floor of generally predetermined area at said prescribed depth parallel to said first surface, a layer of polysilicon deposited on said wafer first surface and extending across the opening of said cavity, said polysilicon being doped to a conductive state in an area overlying at least a portion of said cavity to form a flexible electrically conductive diaphragm;

said second surface of said wafer being formed with an opening providing a passage through said wafer into said cavity, the opening of said passage into said cavity having an area small compared to the area of said cavity floor, said cavity floor serving as an overrange pressure stop for pressure acting to move said diaphragm toward said cavity floor, a second sensor module comprising, a second single crystal silicon wafer doped to a conductive state and having first and second opposed parallel surfaces, a cavity formed as an opening in said second wafer first surface to a prescribed depth with a floor of generally predetermined area at said prescribed depth parallel to said first surface, said second surface of said second wafer being formed with an opening providing a passage through said wafer into said cavity, the opening of said passage into said cavity having an area small compared to the area of said cavity floor, said cavity floor serving as an overrange pressure stop for pressure acting to move said diaphragm toward said second wafer cavity floor, said first and second modules being joined together by placing said first module's polysilicon layer in contact with and bonded to, said second module's silicon wafer first surface, electrical contact means for providing independent electrical contacts to said first and second silicon wafers and to said diaphragm, thereby forming a pair of capacitors with a common flexible electrode to Provide variations in the capacitances of said pair of capacitors in response to variations in differential pressure across said diaphragm.

13. A differential pressure sensing device in accordance with claim 12 wherein a first thin dielectric layer is coated on said first wafer first surface between said first wafer first surface and said polysilicon layer and a second thin dielectric layer is coated on said second wafer first surface between said second wafer first surface and said polysilicon layer.

14. A differential pressure sensing device in accordance with claim 13 wherein said polysilicon layer is bonded to said second module's silicon wafer's first surface through a dielectric bonding material.

15. A bidirectional differential pressure sensing device comprising, a single crystal silicon wafer doped to a conductive state and having first and second opposed parallel surfaces;

a cavity formed as an opening in said first surface to a prescribed depth, said cavity being formed as a two step recess, the first recess being of larger diameter than the second recess, the second recess having a generally predetermined area, and extending from the floor of said first recess toward said second wafer surface, a layer of electrically insulating material deposited on said first recess floor and extending across the opening of said second recess, said electrically insulating layer being treated to become conductive in an area overlying a portion of said second recess to form an electrically conductive flexible diaphragm, said wafer second surface having an opening providing a passage through said wafer into said second recess, the opening of said passage into said second recess being of area small compared to the area of said floor, a glass sheet placed on said wafer first surface and bonded to it, said glass sheet overlying said cavity opening, said glass sheet having a conductive area overlying a portion of said cavity, said portion being generally aligned with the area of said second recess floor, first, second and third electrical contacts for providing independent electrical contact to said silicon wafer, to said electrically conductive area of said electrically insulating layer and to said glass plate conductive area, and means for allowing fluid pressure into the volume between said diaphragm and said glass plate.

16. A pressure sensing device in accordance with claim 15 where said layer of electrically insulating material is polysilicon and said treatment is doping.

17. A pressure sensing device in accordance with claim 16 wherein a thin layer of dielectric material is coated on said silicon wafer first surface between said first surface and said polysilicon layer.

* * * * *

UNITED STATES PATENT AND TRADEMARK OFFICE
CERTIFICATE OF CORRECTION

PATENT NO. : 5,323,656
DATED : June 28, 1994
INVENTOR(S) : Clifford D. Fung and Kevin H.-L. Chau It is certified that error appears in the above-indentified patent and that said Letters Patent is hereby corrected as shown below:

At column 2, line 11, please replace "present invention Provides" with --present invention provides--;

In claim 12 at column 8, line 66, please replace "Presure sensing" with --pressure sensing--;

In claim 12 at column 9, line 46, please replace "to Provide variations" with --to provide variations--; and At column 8, line 56, after "flexible", please insert --electrode--.

Signed and Sealed this

Twenty-sixth Day of September, 1995

Attest:

BRUCE LEHMAN

*Attesting Officer*          *Commissioner of Patents and Trademarks*